Feb. 7, 1956     O. MITCHELL     2,733,480
EXTRACTOR-FEEDER FOR ROUGHLY PICKED COTTON
Filed Aug. 23, 1951
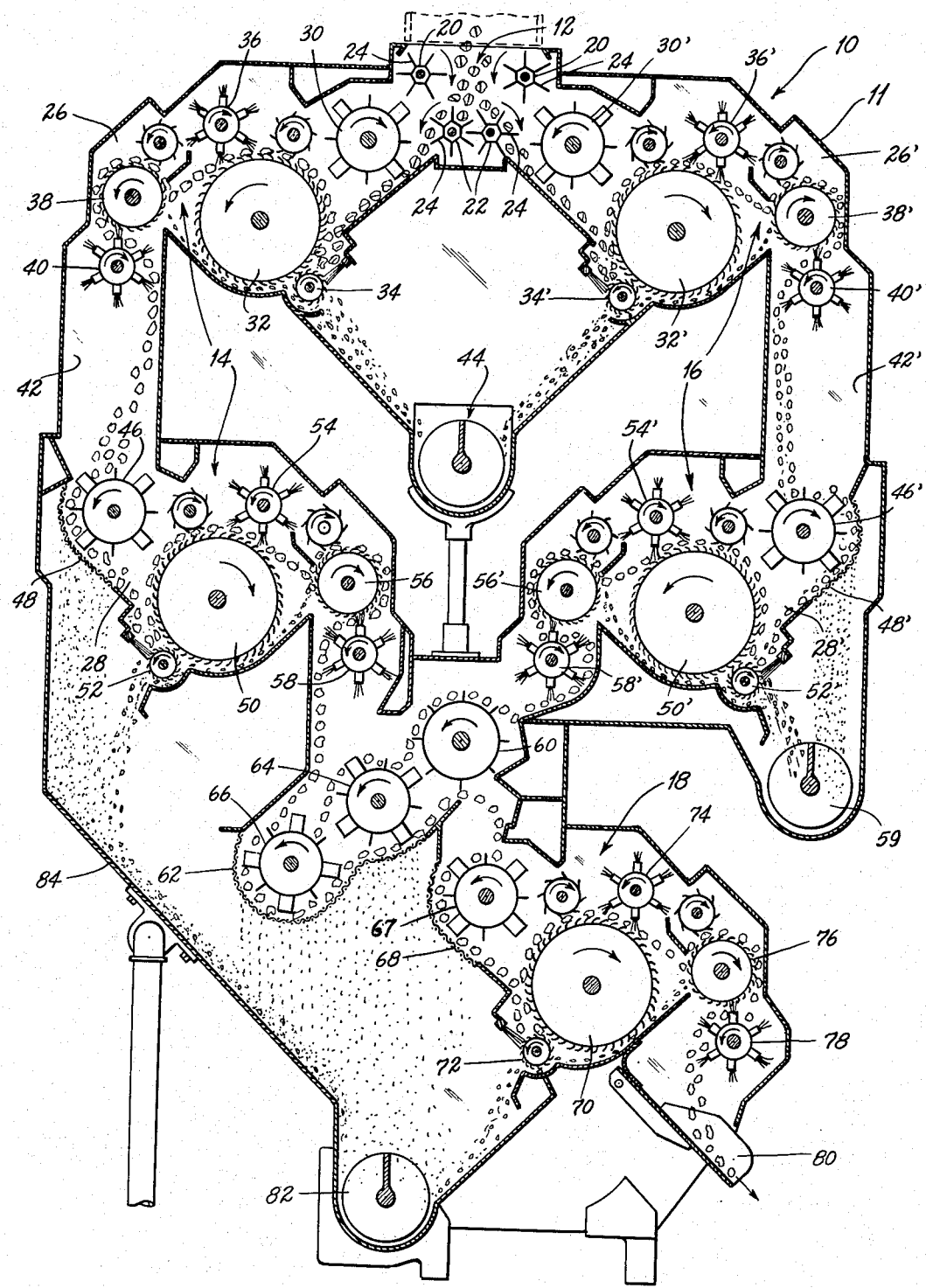
INVENTOR:
ORVILLE MITCHELL,
By Kingsland, Rogers & Ezell
ATTORNEYS

United States Patent Office 2,733,480
Patented Feb. 7, 1956

2,733,480

EXTRACTOR-FEEDER FOR ROUGHLY PICKED COTTON

Orville Mitchell, Dallas, Tex., assignor to John E. Mitchell Company, Dallas, Tex., a corporation of Missouri Application August 23, 1951, Serial No. 243,217

6 Claims. (Cl. 19—37)

The present invention relates generally to the cleaning of roughly picked cotton prior to its introduction into the gins, and more particularly to a novel extractor-feeder having an increased capacity and which is especially applicable for use with roughly picked cotton containing a relatively large amount of leaf trash and hulls.

As is well known to those familiar with the growing and processing of cotton, labor shortages and the increased price of cotton have resulted in a widespread usage of mechanical harvesting devices and hand stripping which unfortunately pick up a large amount of hulls and leaf trash along with the cotton. Also, the harvesting season has been concentrated into a shorter period of time because the sooner the cotton can be taken out of the fields, the less likelihood there is of deterioration. In addition to the above, the abnormal difference in price between the different grades of ginned cotton places a premium on well-cleaned cotton. All of this requires that the gin plants be able to produce cleaner cotton from cotton containing more leaf trash and hulls than usual, in a greatly increased volume.

The capacity of the extractor-feeders in use at the present time is limited primarily by the speed at which the uncleaned cotton can pass through the extracting mechanism. If the speed is too great, the hulls cannot fight their way through the cotton stream and escape, with the result that some are carried over into the gin stands and the cotton is not as clean as it could be.

It is an object of the present invention, therefore, to provide a novel extractor-feeder of increased capacity which occupies little more space than conventional extractor-cleaners. More particularly, it is an object to provide an extractor-feeder which has a capacity of twice that of a conventional device of substantially the same size and which produces cleaner cotton from cotton containing more hulls and leaf trash than usual.

Another object is to provide a novel feeding mechanism for an extractor-feeder which accurately separates the incoming cotton into two equal amounts and feeds one-half of it into each side of the extractor-cleaner units.

Further objects and advantages of the present invention will be apparent from the following description, reference being had to the accompanying drawing wherein a preferred embodiment of the present invention is shown.

In the drawing, the figure shows a vertical transverse sectional view of an extractor-feeder constructed in accordance with the teachings of the present invention.

In one form, the device broadly comprises two vertically extending roughing extractor-cleaner units each having an upper section and a lower section, a feeding mechanism at the top for dividing the cotton received from a distributor hopper and feeding half into the upper section of each roughing unit, and a finishing extractor-cleaner unit below the roughing units which receives the cotton from both roughing units. The device is constructed so that the hulls separated from the cotton in the upper sections of the roughing units follow an inner path to a conveyer at the center of the device, and the hulls and leaf trash separated from the cotton in the lower sections follow an outer path, thereby effectively utilizing all of the space within the extractor-cleaner housing.

Referring to the drawing more particularly by reference numerals, 10 indicates generally a novel extractor-cleaner embodying the teachings of the present invention, which includes a housing 11 containing a feeding mechanism at the upper end thereof generally indicated by the numeral 12, a vertically extending roughing extractor-cleaner unit 14 at the left side of the housing 11, a right-hand roughing extractor-cleaner unit 16 which is similar to the left-hand roughing unit 14 and substantially parallel with it, and a finishing unit 18 disposed immediately below the two roughing units 14 and 16 to receive the cotton from them.

The feeding mechanism 12 is disposed immediately below the inlet of the device and comprises a pair of rotatably mounted upper feeder rollers 20 and a pair of similarly mounted lower feeder rollers 22. Each of the rollers contains a plurality of radially extending blade elements 24 for moving the cotton. As indicated in the drawing, the upper feeder rollers 20 rotate inwardly and downwardly and are spaced apart so that there is an appreciable space between the ends of the inwardly extending blade elements 24 to permit the cotton to pass between the rollers without jamming tightly against the blade elements. The lower feeder rollers 22 rotate upwardly and outwardly and are spaced close together so that the blade elements 24 overlap. Each of the lower feeder rollers 22 is spaced from its adjacent upper feeder roller 20 so that the distance between them is approximately equal to one-half the distance between the upper rollers 20. Thus, the cotton entering the extractor-cleaner 10 is carried downwardly between and by the upper feeder rollers 20, and, when it reaches the lower feeder rollers 22, it is divided by them into two substantially equal amounts and one-half is carried to the right by the right-hand upper and lower feeder rollers, and the other half is carried to the left by the left-hand upper and lower feeder rollers. The feeder rollers are so positioned that the separated streams going to the right and to the left are directed at approximately right angles to the incoming stream. This action feeds the cotton and hulls into the upper ends of the roughing units 14 and 16.

The two roughing units 14 and 16 are exactly the same except for the direction of rotation of the various elements contained in them so that only the left-hand unit 14 will be described, the elements of the right-hand unit being identified by the same numerals primed.

The left-hand unit 14 comprises an upper section 26 and a lower section 28 which are very similar in construction and which contain conventional type extracting and reclaiming elements. The upper and lower sections 26 and 28 differ, however, in the flow paths of the cotton and hulls. In the upper section 26 the cotton flow follows an outer path and the hulls follow an inner path, whereas in the lower section 28 the direction is reversed, the cotton following an inner path and the hulls an outer path, as will be more fully described hereinafter.

The upper unit 26 contains a directing cylinder 30 which is positioned adjacent the feeding mechanism 12 for carrying the cotton and hulls to an extracting saw cylinder 32 and a reclaimer saw cylinder 34 disposed adjacent to it. A brush doffer 36 is positioned above the extracting saw cylinder 32 for sweeping the cotton from it onto a second and smaller extracting saw cylinder 38. A second brush doffer 40 is disposed below the smaller extracting saw cylinder 38 and at the upper end of a passageway 42 which connects the upper section 26 with the lower section 28.

Disposed between the left- and right-hand roughing units 14 and 16 is a hull conveyor 44 of conventional screw construction which is disposed below the upper sections 26 and 26' so as to receive the hulls from the extracting saw cylinders 32 and 32', and 38 and 38'.

The lower section 28 includes a directing cylinder 46 disposed immediately below the lower end of the passageway 42 and adjacent the screen 48 of a cleaning cylinder. An extracting saw cylinder 50 and a reclaimer saw cylinder 52 are located below and to the right of the directing cylinder 46. Positioned above the extracting saw cylinder 50 is a brush doffer 54 for sweeping the cotton from it onto a second and smaller extracting saw cylinder 56 positioned to the right. A second brush doffer 58 is disposed below the smaller extracting saw cylinder 56 for removing the cotton from it.

Positioned immediately below the cleaning screen 48' and the extracting saw cylinder 50' of the lower right-hand element 28' is a hull and trash conveyor 59 of conventional screw construction.

The lower sections 28 and 28' are positioned so that their outlets converge to a cleaning chamber positioned at the upper end or inlet of the finishing unit 18, which will now be described. Positioned at the upper end of the chamber is a feeder roller 160 which feeds the cotton received from the right-hand roughing unit 16 into the cleaning chamber which contains a screen 62 and two cleaning cylinders 64 and 66. The cylinder 66 receives the cotton from the left-hand cleaning unit 14. Disposed below the outlet of the cleaning chamber is a directing cylinder 67 which is positioned adjacent another cleaning screen 68. The directing cylinder 66 conveys the cotton and remaining hulls to an extracting saw cylinder 70 and a reclaimer saw cylinder 72 disposed below and adjacent to it. A brush doffer 74 is positioned above the extracting saw cylinder 70 for removing the cotton from it and passing it to a second and smaller extracting saw cylinder 76 from which the cotton is removed by another brush doffer 78 disposed below it.

An outlet 80 is provided below the brush doffer 78 for directing the cotton from the extractor-feeder 10 into a gin stand usually positioned below it.

Another screw-type hull and trash conveyor 82 is provided at the bottom of the device and includes an apron 84 which extends upwardly and toward the left so as to receive the trash and hulls from the lower left-hand roughing element 28 and from the finishing unit 18.

Operation

In the usual arrangement in a gin plant, the extractor-feeder 10 is positioned under a hopper of the distributor so that the upper feeder rollers 20 pull the cotton, hulls and leaf trash downwardly between them and into the lower feeder rollers 22 which divide the materials into two substantially equal streams. The one stream is carried to the left and into the left-hand roughing unit 14 by the left-hand upper feeder roller 20 and the left-hand lower feeder roller 22 which are spaced apart a distance somewhat less than the distance between the top feeder rollers 20. The other stream is carried to the right into the other roughing unit in like manner by the right-hand set of upper and lower feeder rollers 20 and 22.

The cotton hulls and leaf trash entering the left-hand roughing unit 14 are carried into the upper section 26 of it by the directing cylinder 30 which rotates in the clockwise direction so as to carry the materials inwardly of it. The materials are directed onto the extracting saw cylinder 32 and the reclaimer saw cylinder 34 so as to separate some of the hulls from the cotton and cause them to fall downwardly and inwardly into the conveyer 44. The cotton, remaining hulls and leaf trash are carried upwardly and to the left by the extracting saw cylinder 32 which rotates in the counterclockwise direction. The brush doffer 36 sweeps the materials from the extracting saw cylinder 32 onto the smaller extracting saw cylinder 38 where some more of the hulls are separated from the cotton, the separated hulls passing downwardly and to the right beneath the extracting saw cylinder 32 and into the conveyer 44. The materials carried by the small extracting saw cylinder 38 are swept off by the brush doffer 40 and fall downwardly through the passageway 42 into the lower section 28.

The materials entering the lower section 28 are carried outwardly by the directing cylinder 46 against the cleaning screen 48 so as to cause some of the leaf trash to pass through it and fall onto the apron 84 and into the conveyer 82. The remaining leaf trash, cotton and hulls are carried against the extracting saw cylinder 50 and reclaimer saw cylinder 52 where some more of the hulls are separated and fall downwardly and outwardly onto the apron 84 and into the conveyer 82. The materials carried upwardly on the extracting saw cylinder 50 are swept off by the brush doffer 54 and onto the smaller extracting saw cylinder 56 where some more of the hulls are separated from the cotton. These separated hulls pass outwardly and downwardly beneath the extracting saw cylinder 50 and fall onto the apron 84 and into the conveyer 82. The remaining materials are carried inwardly by the smaller extracting saw cylinder 56 and are swept from it by the brush doffer 58, downwardly and into the inlet of the finishing unit 18.

The operation of the right-hand roughing unit 16 is very similar to that of the left-hand one. Some of the hulls are separated from the cotton in the upper section 26' and are carried inwardly to the conveyer 44 and the cotton and remaining hulls, along with the leaf trash, are carried along an outer path into the lower section 28'. The only difference between the left- and right-hand roughing units is that in the latter the leaf trash and hulls separated out in the lower section fall into a separate conveyer 59. However, in both the lower sections the materials follow the same general path, i. e., the hulls and trash flow outwardly and the cotton flows inwardly.

Thus, the cotton with a small amount of hulls and leaf trash mixed in with it converges from both of the roughing units 14 and 16 into the inlet of the finishing unit 18.

The materials from the left-hand roughing unit 14 fall onto the cleaning cylinders 64 and 66, and the materials from the right-hand roughing unit 16 are carried onto the same cylinders by the feeder roller 60.

The cleaning cylinders 64 and 66 carry the materials against the cleaning screens 62, causing some more of the leaf trash to pass through and fall onto the apron 84 and into the conveyer 82. The remaining materials are carried upwardly to the right and fall onto the directing cylinder 67, which carries them against the cleaning screen 68, causing some more of the trash to be separated out and fall onto the apron 84 and into the conveyer 82.

The directing cylinder 67 carries the remaining materials onto the extracting saw cylinder 70 and reclaimer saw cylinder 72, where some more of the hulls are separated and fall downwardly into the conveyer 82. The cotton and hulls carried upwardly and to the right by the extracting saw cylinder 70 are swept off by the brush doffer 74 into the smaller extracting saw cylinder 76, where the remaining hulls are separated and passed downwardly and to the left under the extracting saw cylinder 70 and fall into the conveyer 82. The clean cotton remaining on the smaller extracting saw cylinder 76 is then swept off by the brush doffer 78 into the outlet 80.

Thus, it is apparent that there has been provided a novel extractor-feeder which fulfills all of the objects and advantages sought therefor.

The novel feeding mechanism at the top of the device divides the cotton and hulls into two substantially equal streams so that only one-half of the material passes through each of the roughing units. This doubles the capacity of the device, and because of the flow pattern of the cotton and hulls whereby the cotton flows outwardly in the upper sections and inwardly in the lower sections, and the hulls flow inwardly in the upper sections and outwardly in the lower sections, there is only a slight increase in size of the present device over the known extractor-feeders of one-half the capacity.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. The combination of a pair of laterally spaced vertically extending roughing extractor-cleaner units; a feeding mechanism for receiving a stream of mixed cotton and hulls and separating it into two separate streams of substantially equal volume and feeding each separate stream into one of the roughing units; each roughing unit including an upper hull-extracting section and a lower hull-extracting section so arranged that the two streams of cotton flow outwardly in diverging paths in the upper sections and inwardly in converging paths in the lower section and the streams of hulls flow inwardly in converging paths to a common hull conveyer situated between said upper sections and outwardly in diverging paths in the lower section.

2. The combination of a housing, a pair of laterally spaced cotton treating units in the housing; an inlet in the housing and a feeding mechanism disposed above said units for receiving a stream of mixed cotton and hulls introduced through the inlet downwardly into the feeding mechanism, and for separating it into two separate streams of substantially equal volume and feeding each stream into the upper end of one of the units; said feeding mechanism including a pair of spaced upper feeder rollers each containing outwardly extending radial projections for contacting and advancing the cotton, means for rotating said rollers in opposite directions so that the projections move downwardly between the rollers, a pair of lower feeder rollers spaced below the upper rollers and containing outwardly extending projections for contacting the cotton, and means for rotating the lower rollers in opposite directions so that the projections move upwardly between them, the lower rollers being spaced close together so that the projections overlap to prevent the cotton from falling downwardly between them, a cotton processing unit disposed below the cotton treating units; and means for combining the streams from the treating units into a single stream and directing it into the processing unit.

3. A device of the type described, comprising a housing; a pair of laterally spaced and vertically extending extractor-cleaner units disposed within the housing, each unit including an upper cleaning section and a lower cleaning section; means for feeding a stream of mixed cotton and hulls into each unit; a hull conveyer disposed within the housing between the two extractor-cleaner units and below the upper sections thereof; the extracting mechanism in the upper sections including means to cause the two streams of cotton to flow outwardly in diverging paths and means to cause the hulls to flow inwardly in converging paths and into the hull conveyer; and means to feed the cotton from each upper cleaning section to the corresponding lower cleaning section for being further cleaned thereat.

4. A device of the type described, comprising a housing; a pair of laterally spaced and vertically extending extractor-cleaner units disposed within the housing, each unit including separate extractor mechanisms in an upper section and a lower section; means for feeding a stream of mixed cotton and hulls into each unit; a first hull conveyer disposed within the housing between the two extractor-cleaner units and below the upper sections thereof; second and third hull conveyers within the housing disposed below the lower sections in each unit; the extracting mechanisms in the upper sections being arranged so that the two streams of cotton flow outwardly in diverging paths and the hulls flow inwardly in converging paths and into the first hull conveyer; and the extracting mechanism in the lower sections being arranged so that the two streams of cotton flow inwardly in converging paths and the hulls flow outwardly in diverging paths and into the second and third hull conveyers.

5. A device of the type described, comprising a housing; a pair of laterally spaced and vertically extending extractor-cleaner units disposed within the housing, each unit including separate extractor mechanisms in an upper section and a lower section; a feeding mechanism disposed within the housing above the units for receiving a stream of mixed cotton and hulls and separating it into two separate streams of substantially equal volume and feeding each stream into the upper end of one of the units, said feeding mechanism including a pair of spaced upper feeder rollers each containing outwardly extending projections for contacting the cotton, means for rotating said rollers in opposite directions so that the projections move downwardly between the rollers, a pair of lower feeder rollers spaced below the upper rollers and containing outwardly extending projections for contacting the cotton, and means for rotating the lower rollers in opposite directions so that the projections move upwardly between them, the lower rollers being spaced close together so that the projections overlap to prevent the cotton from falling downwardly between them; a first hull conveyer disposed within the housing between the two extractor-cleaner units and below the upper sections; second and third hull conveyers within the housing below the lower sections; the extracting mechanisms in the upper sections being arranged so that the two streams of cotton flow outwardly in diverging paths and the hulls flow inwardly in converging paths and into the first hull conveyer; and the extracting mechanism in the lower section being arranged so that the two streams of cotton flow inwardly in converging paths and the hulls flow outwardly in diverging paths and into the second and third hull conveyers.

6. In a cotton cleaning machine for cleaning a large volume of cotton without overloading the cleaning devices, and delivering the same to a gin of capacity to handle such large volume; a housing having an inlet for receiving a mass of uncleaned cotton larger than the capacity of the cleaner units, and an outlet for delivering cleaned cotton to a gin; feeding means within the housing adjacent the inlet to receive the mass of uncleaned cotton, the feeding means having mechanism to divide the cotton into substantially equal smaller streams and wall means to separate the streams and separately conduct them in different directions; separate cleaner units within the housing, the wall means leading each stream to one cleaner unit, each unit having a rotary cleaning cylinder, means to direct the uncleaned cotton stream onto the cylinder, means to separate the trash from the cotton on the cylinder, means including outlet means through the wall means and additional wall means to receive the trash and conduct it away from the stream of cotton, each cleaner unit having less capacity than that required for treating the entire mass of cotton that can be introduced into the inlet, but having sufficient capacity to clean one of the smaller streams divided from the main stream; and each cleaner unit having means to direct the cleaned cotton in a further stream after separation of the foreign matter from the cotton; means to reunite the two cotton streams after they leave the cleaning units and means to deliver the same to the outlet as a single stream for delivery to the gin; and mechanism to collect the foreign matter removed from the cotton for removal of such matter from the housing.

References Cited in the file of this patent

UNITED STATES PATENTS

| | | |
|---|---|---|
| 1,139,345 | Conrad | May 11, 1915 |
| 1,331,000 | Conrad | Feb. 17, 1920 |
| 1,524,239 | Hancock | Jan. 27, 1925 |
| 1,709,531 | Lane | Apr. 16, 1929 |
| 1,724,943 | Lane | Aug. 20, 1929 |
| 1,925,813 | Mitchell | Sept. 5, 1933 |
| 2,079,547 | Court | May 4, 1937 |
| 2,100,301 | Mitchell | Nov. 23, 1937 |
| 2,231,280 | Mitchell | Feb. 11, 1941 |
| 2,365,793 | Asbill | Dec. 26, 1944 |
| 2,607,958 | Rusca et al. | Aug. 26, 1952 |